United States Patent
Sardella et al.

(10) Patent No.: US 10,235,052 B2
(45) Date of Patent: Mar. 19, 2019

(54) STORAGE SYSTEM WITH DATA DURABILITY SIGNALING FOR DIRECTLY-ADDRESSABLE STORAGE DEVICES

(71) Applicant: EMC IP Holding Company LLC, Hopkinton, MA (US)

(72) Inventors: Steven Sardella, North Grafton, MA (US); Walter A. O'Brien, III, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/975,254

(22) Filed: May 9, 2018

(65) Prior Publication Data

US 2018/0260116 A1 Sep. 13, 2018

Related U.S. Application Data

(63) Continuation of application No. 15/198,404, filed on Jun. 30, 2016, now Pat. No. 9,996,273.

(51) Int. Cl.
*G06F 3/00* (2006.01)
*G06F 3/06* (2006.01)
*G06F 13/24* (2006.01)

(52) U.S. Cl.
CPC ............. *G06F 3/061* (2013.01); *G06F 3/065* (2013.01); *G06F 3/0659* (2013.01);
(Continued)

(58) Field of Classification Search
CPC ............. G06F 9/45558; G06F 9/30036; G06F 9/30098; G06F 9/3001; G06F 9/3004
(Continued)

(56) References Cited

U.S. PATENT DOCUMENTS 4,658,350 A * 4/1987 Eggebrecht ......... G06F 12/0623
710/26
5,845,313 A * 12/1998 Estakhri ................ G06F 3/0613
711/103

(Continued)

OTHER PUBLICATIONS

PCI-SIG, "Multicast," PCI Express Base Specification Version 2.0, May 8, 2008, 19 pages.

*Primary Examiner* — Titus Wong
(74) *Attorney, Agent, or Firm* — Ryan, Mason & Lewis, LLP

(57) ABSTRACT

A storage system in one embodiment comprises at least one processor, a processor memory, an input-output controller, and a directly-addressable storage device having volatile memory and non-volatile memory. The input-output controller generates a plurality of write commands in conjunction with storage of data in the storage system, the write commands including at least a first write command comprising the data and a second write command comprising one or more interrupts. If an address of a given one of the write commands falls within a specified interrupt group window, the write command is copied to the directly-addressable storage device so as to provide at least one of the one or more interrupts to that storage device. The directly-addressable storage device responds to receipt of the interrupt by writing data from the volatile memory to the non-volatile memory and generating a corresponding additional interrupt to the processor.

20 Claims, 2 Drawing Sheets

(52) U.S. Cl.
CPC .......... *G06F 3/0685* (2013.01); *G06F 3/0688* (2013.01); *G06F 13/24* (2013.01)

(58) Field of Classification Search
USPC ........................................................ 710/260
See application file for complete search history.

(56) References Cited

U.S. PATENT DOCUMENTS

| | | | |
|---|---|---|---|
| 5,924,113 A * | 7/1999 | Estakhri | G06F 3/0613 711/103 |
| 2007/0008988 A1 * | 1/2007 | Kim | H04L 12/2803 370/462 |
| 2013/0254487 A1 | 9/2013 | Tanaka et al. | |
| 2014/0115223 A1 | 4/2014 | Guddeti et al. | |
| 2015/0199129 A1 * | 7/2015 | Nair | G06F 3/064 711/114 |

\* cited by examiner

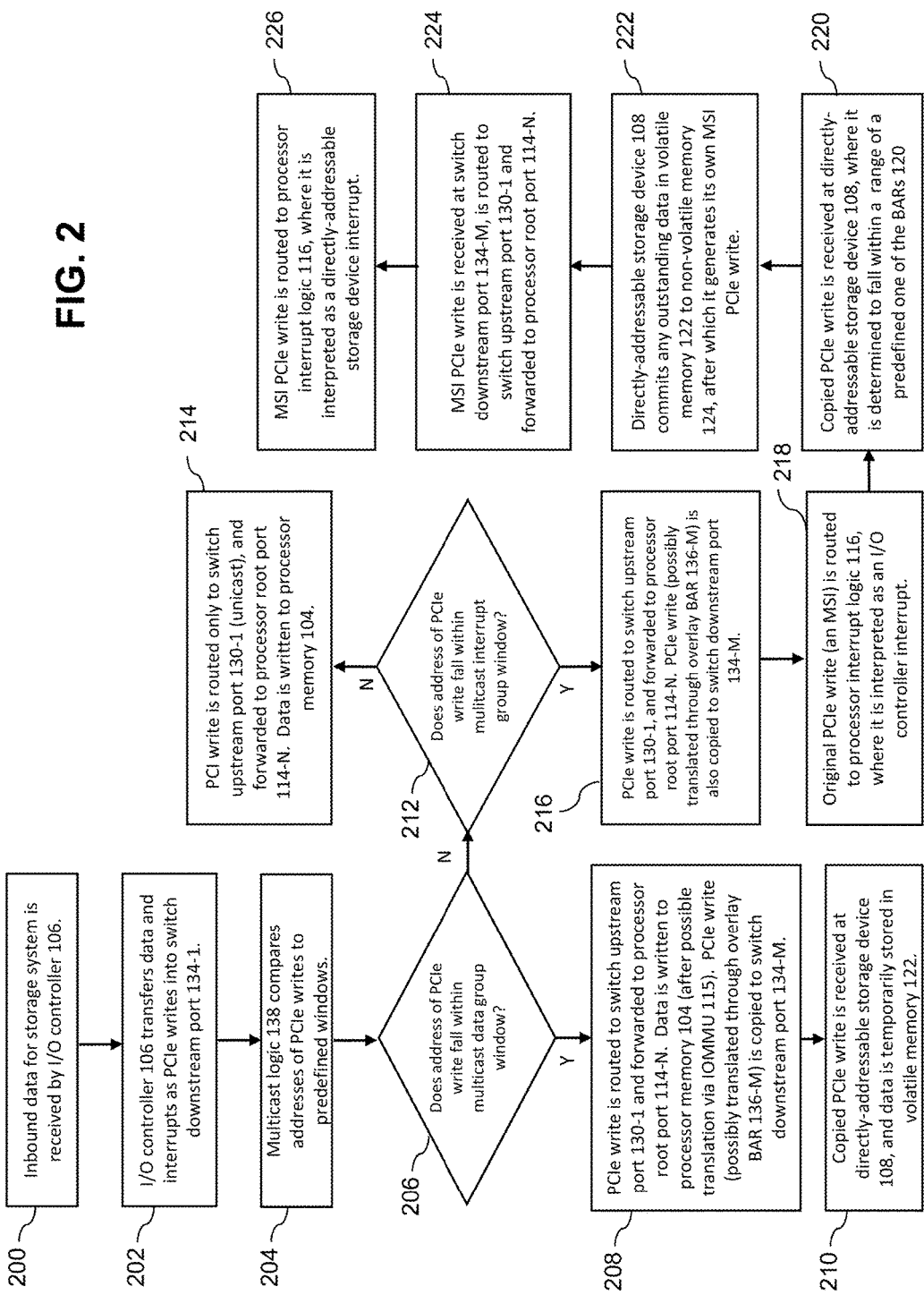

STORAGE SYSTEM WITH DATA DURABILITY SIGNALING FOR DIRECTLY-ADDRESSABLE STORAGE DEVICES

CROSS-REFERENCE TO RELATED APPLICATION

The present application is a continuation of U.S. patent application Ser. No. 15/198,404 filed Jun. 30, 2016, and entitled "Storage System with Data Durability Signaling for Directly-Addressable Storage Devices," the disclosure of which is incorporated by reference herein.

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. One or more of such storage tiers may comprise solid state drives (SSDs) which are illustratively implemented using non-volatile memory such as flash memory.

SUMMARY

Illustrative embodiments of the present invention provide information processing systems that include storage systems configured to implement data durability signaling for directly-addressable storage devices such as SSDs that include non-volatile memory.

For example, in some embodiments, such data durability signaling can include an interrupt that is generated by the directly-addressable storage device in order to provide an indication to a processor of the storage system that the directly-addressable storage device has committed data previously stored in volatile memory of the storage device to storage in non-volatile memory of the storage device.

In one embodiment, a storage system comprises at least one processor, a processor memory, an input-output controller, and a directly-addressable storage device having volatile memory and non-volatile memory. The input-output controller generates a plurality of write commands in conjunction with storage of data in the storage system, the write commands including at least a first write command comprising the data and a second write command comprising one or more interrupts. If an address of a given one of the write commands falls within a specified data group window, the data is written to the processor memory and the write command is copied to the directly-addressable storage device so as to cause the data to also be written to the volatile memory of that storage device. If the address of the given write command does not fall within the specified data group window and does not fall within a specified interrupt group window, the data is written to the processor memory but the write command is not copied to the directly-addressable storage device. If the address of the given write command falls within the specified interrupt group window, the write command is copied to the directly-addressable storage device so as to provide at least one of the one or more interrupts to that storage device. The directly-addressable storage device responds to receipt of the interrupt by writing data from the volatile memory to the non-volatile memory and generating a corresponding additional interrupt to the processor.

In some embodiments, the processor further comprises a PCIe root complex having a plurality of root ports supporting communication with the input-output controller and the directly-addressable storage device.

Such embodiments may further include a PCIe switch coupled via an upstream port of the PCIe switch to a given one of the root ports of the PCIe root complex of the processor and coupled via respective downstream ports of the PCIe switch to the input-output controller and the directly-addressable storage device. The PCIe switch further comprises multicast logic configured to determine if the address of the given write command falls within the specified data group window or the specified interrupt group window and to control copying of the write command in accordance with that determination.

In other embodiments, the determination as to whether or not the address of a given write command falls within the specified data group window or the specified interrupt group window and the controlling of the copying of the write command in accordance with that determination can be performed at least in part in another part of the storage system, such as in the PCIe root complex of the processor.

In some embodiments, the storage system comprises a multi-tier storage system, with the directly-addressable storage devices being part of a fast tier or other type of front-end storage tier of the multi-tier storage system. The front-end storage tier in some embodiments more particularly comprises a fast tier of a 2 TIERS™ storage system, although other types of multi-tier storage systems can be used in other embodiments.

These and other illustrative embodiments include, without limitation, apparatus, systems, methods and computer program products comprising processor-readable storage media.

BRIEF DESCRIPTION OF THE DRAWINGS

FIG. 2 is a flow diagram of a data durability signaling process for a directly-addressable storage device in the storage system of FIG. 1.

DETAILED DESCRIPTION

Figure 1:
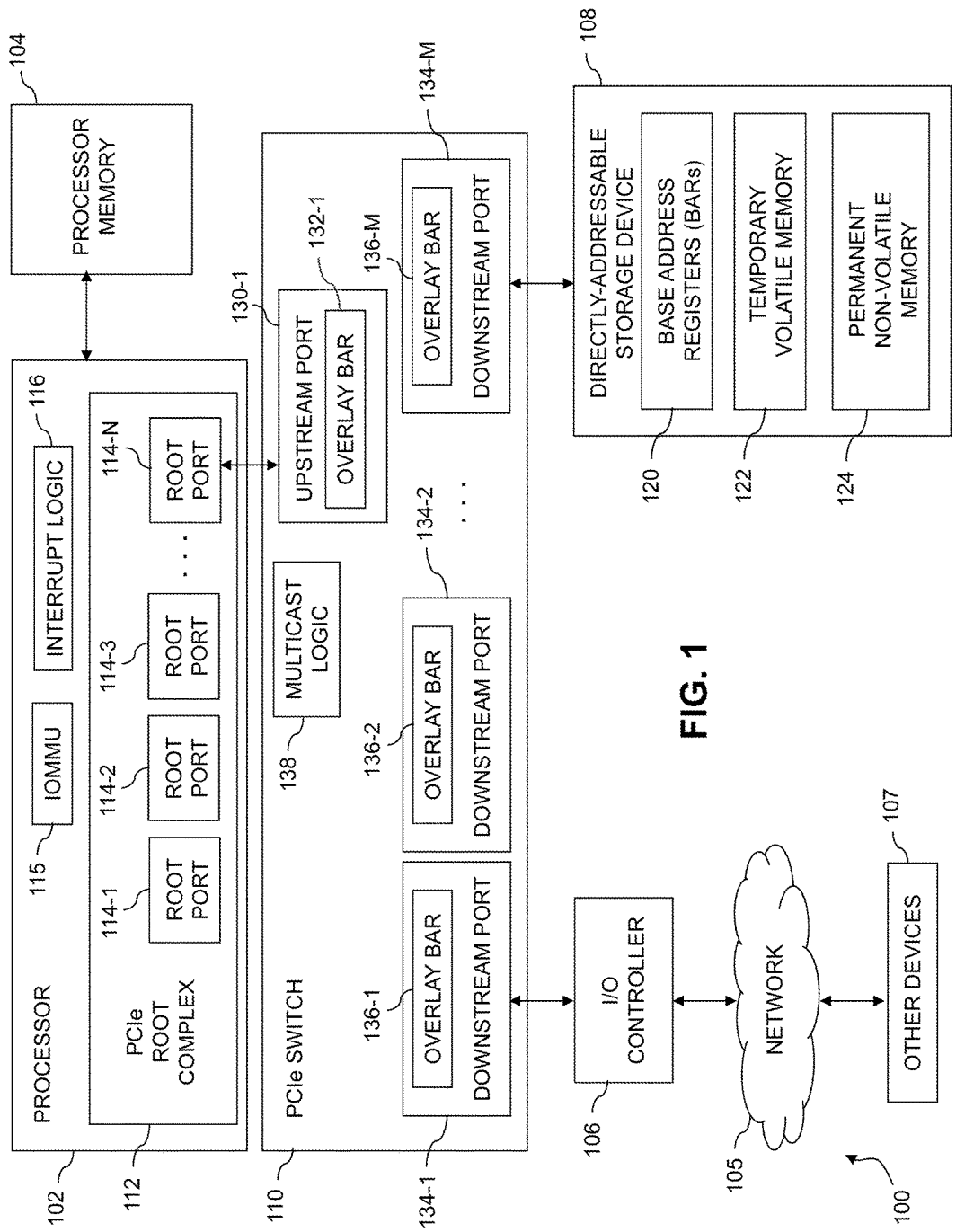
FIG. 1 is a block diagram of an information processing system comprising a storage system that implements data durability signaling for a directly-addressable storage device in an illustrative embodiment.

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

FIG. 1 shows an information processing system 100 configured in accordance with an illustrative embodiment. The information processing system 100 comprises a storage system that includes a processor 102, a processor memory 104, an input-output (I/O) controller 106, a directly-addressable storage device 108 and a peripheral component interconnect express (PCIe) switch 110. Although only single instances of these storage system elements are shown in the figure, it is to be appreciated that other embodiments can include multiple instances of each of one or more of the storage system elements 102, 104, 106, 108 and 110. Also, the system 100 may comprise multiple storage systems each having sets of elements 102, 104, 106, 108 and 110.

A network 105 couples the I/O controller 106 to other devices 107 of the information processing system 100 that are not considered part of the storage system. For example, the additional devices may comprise computers, virtual machines, containers or other types of processing devices that generate data within the system 100 for storage in the storage system comprising elements 102, 104, 106, 108 and 110. Also by way of example only, such data generated within the system 100 can be moved between the other devices 107 and the I/O controller 106 using remote direct memory access (RDMA) connections over InfiniBand or Gigabit Ethernet. Numerous other types of connections and associated data transfer protocols can be used in other embodiments.

The I/O controller 106 in some embodiments is configured for connecting to host devices. Additionally or alternatively, the I/O controller 106 can be configured for connecting to other storage devices. As one example, the I/O controller may be implemented in the form of a serial attached SCSI (SAS) controller used to connect to SAS hard disk drives (HDDs), although a wide variety of other types of I/O controllers can be also be used.

It is apparent from the above that the other devices 107 in some embodiments comprise host devices, storage devices, or combinations of these and other devices.

The storage system further comprises a PCIe root complex 112 having a plurality of root ports 114-1, 114-2, 114-3, . . . 114-N. One or more of these root ports 114 are utilized to support communication between the I/O controller 106 and the directly-addressable storage device 108 via the processor 102 and PCIe switch 110. In addition to the PCIe root complex 112, the processor 102 illustratively comprises an I/O memory management unit (IOMMU) 115 and interrupt logic 116. The IOMMU 115 in some embodiments is configured to support virtualization functionality within the system 100.

The directly-addressable storage device 108 comprises base address registers (BARs) 120, temporary volatile memory 122 and permanent non-volatile memory 124. The temporary volatile memory 122 provides transient storage for data arriving in the directly-addressable storage device 108 before such data is subsequently persisted in the permanent non-volatile memory 124. The terms "temporary" and "permanent" as used herein are relative terms, and are intended to be broadly construed. Such terms should not be viewed as having any particular respective time periods associated therewith.

The temporary volatile memory 122 in some embodiments may comprise memory implemented in or otherwise associated with a storage controller and utilized only for short-term buffering of data. Numerous other types and arrangements of temporary volatile memory may be used in other embodiments.

The term "directly-addressable storage device" as used herein is intended to be broadly construed as to encompass, for example, a storage device that a processor or I/O controller can access using PCIe reads and writes.

The directly-addressable storage device 108 in some embodiments illustratively comprises one or more SSDs, although it should be understood that other types of storage technologies can be used in other embodiments. Also, combinations of multiple distinct types of storage technologies can be used to implement a given directly-addressable storage device as that term is generally used herein.

The temporary volatile memory 122 of the directly-addressable storage device 108 illustratively comprises dynamic random access memory (DRAM) and the permanent non-volatile memory 124 illustratively comprises flash memory, although other types of memories can be used in other embodiments.

Examples of other non-volatile alternatives to flash memory include resistive RAM, phase change memory, spin torque magnetic RAM (MRAM) and Intel Optane™ devices based on 3D Xpoint memory.

The FIG. 1 embodiment can be configured to implement common storage system operations such as write caching or journaling. For example, in conjunction with such operations, data that has been recently written to the storage system from one or more external hosts is stored in the processor memory 104.

The processor memory 104 illustratively comprises a high performance memory such as DRAM that can support large I/O bandwidths, and also has a relatively low latency, should the data need to be accessed again after the initial write. However, because this memory is volatile, data could be lost, for example, if the storage system were to lose power before the data could be saved to the non-volatile memory 124 of the directly-addressable storage device 108. Different implementations of the directly-addressable storage device 108 include different amounts of volatile memory 122 and non-volatile memory 124, and move (or "commit") data from volatile memory 122 to non-volatile memory 124 at different rates and in different amounts. As a result, different implementations of the directly-addressable storage device 108 will utilize correspondingly different amounts of temporary power backup (e.g., battery or capacitor) in the event that the storage system power is lost before the data is committed to non-volatile memory 124. Such temporary power backup in effect allows the volatile memory 122 to behave for a short period of time after a system power loss as if it were a non-volatile memory.

As will be described in greater detail below, data durability signaling implemented in illustrative embodiments disclosed herein provides improved efficiency in committing data from volatile memory 122 to non-volatile memory 124 and providing an acknowledgement of such commitment back to the processor 102. Accordingly, the above-noted write caching and journaling operations are significantly improved. More particularly, copying of data to the directly-addressable storage device 108 and commitment of the data therein to non-volatile memory 124 can be achieved without requiring multiple accesses to the processor memory 104, thereby avoiding the associated processor overhead costs and also reducing latency. Similar advantages are provided in other contexts.

The PCIe switch 110 in the present embodiment comprises at least one upstream port 130-1 having an overlay BAR 132-1 associated therewith. There may be multiple additional upstream ports and respective overlay BARs implemented within the PCIe switch 110 in a given embodiment, but such additional upstream ports and respective overlay BARs are omitted from the figure for simplicity and clarity of illustration. The upstream port 130-1 is coupled to one of the root ports 114 of the PCIe root complex 112, illustratively root port 114-N.

The PCIe switch 110 further comprises a plurality of downstream ports 134-1, 134-2, . . . 134-M having respective overlay BARs 136-1, 136-2, . . . 136-M associated therewith. The I/O controller 106 is coupled to the first downstream port 134-1 and the directly-addressable storage device 108 is coupled to the final downstream port 134-M. Other I/O controllers, directly-addressable storage devices or other types of PCIe devices can be coupled to respective other ones of the downstream ports 134.

The particular coupling arrangements of upstream port 130-1 to root port 114-N and downstream ports 134-1 and 134-M to respective I/O controller 106 and directly-addressable storage device 108 are presented by way of illustrative example only, and numerous alternative coupling arrangements using other combinations of root ports, switch upstream and downstream ports and PCIe devices can be used in other embodiments.

In operation, data received in the storage system via the I/O controller 106 is processed in a manner that will now be described. Such data illustratively arrives in the I/O controller 106 from one or more of the other devices 107 via the network 105, although data can be received by I/O controller 106 in other ways. The I/O controller 106 generates a plurality of write commands in conjunction with receipt of data to be stored in the storage system. The write commands are assumed to comprise at least a first write command comprising the received data and a second write command comprising one or more associated interrupts.

These write commands in the present embodiment more particularly comprise respective PCIe writes. A given such PCIe write comprising one or more interrupts illustratively comprises one or more respective message signaled interrupts (MSIs) and is more particularly referred to herein as an MSI PCIe write.

The PCIe switch 110 further comprises multicast logic 138 configured to determine if addresses of the write commands fall within what are referred to herein as a multicast data group window and a multicast interrupt group window, and to control copying of the write commands in accordance with that determination. It is assumed for these and other embodiments that the multicast data group window and the multicast interrupt group window do not overlap with one another.

The multicast logic 138 of the PCIe switch 110 in the present embodiment illustratively implements PCIe multicasting functionality as described in the PCIe base specification, which is incorporated by reference herein. Such functionality is suitably modified or otherwise supplemented to implement additional functionality as disclosed herein.

The multicast data group window and multicast interrupt group window are examples of what are more generally referred to herein as respective "specified" data group and interrupt group windows.

It should be noted in this regard that other embodiments of the invention do not require the use of multicast functionality. For example, the disclosed arrangements can be adapted in a straightforward manner to utilize so-called "dual cast" functionality, or a hybrid combination of multicast and dual cast. Other embodiments can utilize multicast-within-processor arrangements. In some embodiments that utilize dual cast or multicast-within-processor arrangements, it may be possible to eliminate the PCIe switch 110. For example, some dual cast or multicast-within-processor embodiments can implement the corresponding functionality within the PCIe root complex 112.

The group determination and controlled copying provided by the multicast logic 138 in the present embodiment illustratively includes examining addresses of the write commands generated by the I/O controller 106 and received in the PCIe switch 110 via the downstream port 134-1.

More particularly, if an address of a given one of the write commands falls within the multicast data group window, the data is written to the processor memory 104 via the upstream port 130-1 and root port 114-N, and the write command is copied to the directly-addressable storage device 108 via the downstream port 134-M so as to cause the data to also be written to the volatile memory 122 of that storage device.

In addition, if the address of the given write command does not fall within the multicast data group window and does not fall within the multicast interrupt group window, the data is written to the processor memory 104 via the upstream port 130-1 and root port 114-N, but the write command is not copied to the directly-addressable storage device 108 via the downstream port 134-M. This is also referred to herein as unicast delivery of the data to the processor memory 104.

Further, if the address of the given write command falls within the multicast interrupt group window, the write command is copied to the directly-addressable storage device 108 via the downstream port 134-M so as to provide at least one of the one or more interrupts to that storage device. The directly-addressable storage device 108 responds to receipt of the interrupt by writing data from the volatile memory 122 to the non-volatile memory 124 and generating a corresponding additional interrupt to the processor 102.

The received interrupt in the present embodiment is interpreted by the directly-addressable storage device 108 as a request to commit any outstanding data in the volatile memory 122 to the non-volatile memory 124. In this context, "outstanding data" is assumed to comprise any data in the volatile memory 122 that is expected to be moved to the non-volatile memory 124, but is not yet committed to the non-volatile memory 124. As mentioned previously, the directly-addressable storage device 108 comprises a set of BARs 120. The directly-addressable storage device 108 confirms that the received interrupt falls within a range of a predefined one of the BARs 120 prior to responding to receipt of the interrupt.

The additional interrupt to the processor 102 as generated by the directly-addressable storage device 108 illustratively provides an acknowledgment from the directly-addressable storage device 108 to the processor 102 that any outstanding data in the volatile memory 122 has been committed to the non-volatile memory 124. This additional interrupt may comprise a modified version of the received interrupt, or a unique interrupt that is distinct from the received interrupt.

It should be noted that the term "interrupt" as used herein is intended to be broadly construed, so as to encompass, for example, interrupt mechanisms based on completion messages. For example, in an illustrative embodiment, the I/O controller 106 may be configured to write a completion message to a non-data area within processor memory 104. The processor 102 periodically polls this area, and when a message update is detected, the software can respond in substantially the same manner as it would if an MSI had occurred. Similar to an MSI, the completion message is a PCIe write, and forces all preceding data into memory. So one possible alternative to multicasting an I/O controller interrupt would be to multicast the I/O controller completion message, and to program one of the BARs 120 of the directly-addressable storage device 108 to respond to it.

Although the above-described illustrative embodiments are presented in the context of storing data incoming into the storage system, the disclosed techniques are not limited to use in this particular context. For example, the disclosed techniques can also be used in conjunction with movement of data previously received and stored in the storage system. Such movement of data from one storage device or location to another within the storage system is an example of a type of "storage of data in the storage system" as that term is broadly used herein. Write commands generated by the I/O controller 106 in conjunction with these and other types of storage of data in the storage system are processed in a manner similar to that described above in order to provide data durability signaling functionality.

In an example of an embodiment involving movement of previously-stored data within the storage system, the directly-addressable storage device 108 may be used to cache data onto faster solid-state storage from slower HDDs. The data being stored into the directly-addressable storage device 108 in this example is already stored in the storage system, but is being moved from other storage devices into the directly-addressable storage device 108.

It is to be appreciated that these and other features of illustrative embodiments are presented by way of example only, and should not be construed as limiting in any way.

Accordingly, different numbers, types and arrangements of processors, processor memories, controllers, switches and directly-addressable storage devices can be used in other embodiments.

Additional details regarding example process operations associated with group determination and controlled copying in illustrative embodiments will be provided below in conjunction with the flow diagram of FIG. 2.

The storage system of the FIG. 1 embodiment may be configured to provide at least a portion of at least one storage tier of a multi-tier storage system. For example, the storage system may comprise at least part of a fast tier of a multi-tier storage system. The fast tier is an example of what is more generally referred to herein as a "front-end storage tier" of the multi-tier storage system. As another example, the storage system may comprise at least part of a capacity tier of a multi-tier storage system. The capacity tier is an example of what is more generally referred to herein as a "back-end storage tier" of the multi-tier storage system.

In some embodiments, the fast tier and the capacity tier of the multi-tier storage system are implemented in the form of a 2 TIERS™ storage system from EMC Corporation of Hopkinton, Massachusetts.

By way of example, a given 2 TIERS™ storage system may comprise fast tier implemented using DSSD™ server-based flash storage devices, also from EMC Corporation, and capacity tier comprising an object store. In such an arrangement, an I/O dispatcher software layer of the 2 TIERS™ storage system may be configured, for example, to pre-fetch data from the object store of the capacity tier into the DSSD™ storage devices of the fast tier, as well as to support other types of data movement.

A wide variety of other types of server-based flash storage devices and multi-tier storage systems can be used in other embodiments, as will be apparent to those skilled in the art.

References herein to DSSD™ storage devices and the 2 TIERS™ storage system are by way of example only.

It is also possible that the storage system of the FIG. 1 embodiment may be part of a single-tier storage system. For example, it may be combined with additional similar systems or components in forming such a single-tier storage system.

A given storage tier of one of the types described above may comprise one or more object stores, including cloud-based object stores such as Amazon Simple Storage Service (S3), GCP Cloud Storage, and Microsoft Azure Blob Storage. Accordingly, cloud-based implementations of the FIG. 1 storage system are possible.

The particular storage drives used in a given storage tier may be varied depending on the particular needs of a given embodiment, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

As another example, the storage system may be used to implement at least a portion of at least one storage node in a cluster file system. Such a cluster file system may comprise a parallel file system, a distributed file system or combinations of multiple file systems of potentially different types.

The storage system of FIG. 1 may be part of a larger storage platform. For example, such a storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, one or more of the other devices 107, as well as other system components, may be implemented at least in part using processing devices of such processing platforms.

As indicated above, communications between elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 226, and is suitable for use in the system 100 but is more generally applicable to other types of systems comprising processors, processor memories, switches and directly-addressable storage devices.

The particular process as illustrated in FIG. 2 represents one example of a data durability signaling process that may be implemented in the system 100, although it is to be appreciated that numerous other types of data durability signaling processes may be implemented in the system 100 in other embodiments.

In step 200, inbound data for the storage system of FIG. 1 is received by the I/O controller 106. Such inbound data is illustratively received in the I/O controller 106 from one or more of the other devices 107 via the network 105.

In step 202, the I/O controller 106 transfers the received data and associated interrupts as PCIe writes into downstream port 134-1 of PCIe switch 110. The PCIe writes include separate PCIe writes for data and interrupts. These different types of PCIe writes can be identified by their respective address ranges. For example, a message signaled interrupt or MSI is implemented as a PCIe write to a predefined address range. The processor 102 interprets PCIe writes to that address range as interrupts. Different processor families typically have different predefined or programmable address ranges for which PCIe writes to those address ranges are interpreted as interrupts rather than data. For example, for Intel Xeon processors, this address range is a 32-bit range given by 0xFEEXXXXX.

In step 204, the multicast logic 138 of the PCIe switch 110 compares addresses of the PCIe writes to predefined windows, including the previously-described multicast data group window and multicast interrupt group window.

In step 206, the multicast logic 138 makes a determination as to whether or not the address of a given one of the PCIe writes falls within the multicast data group window. If the determination is affirmative, the process moves to step 208, and if the determination is negative, the process moves to step 212.

In step 208, the PCIe write is routed by the PCIe switch 110 to upstream port 130-1 and forwarded from that port to processor root port 114-N. The corresponding data is then written to processor memory 104. This operation may involve translation via IOMMU 115. The PCIe write is also copied to downstream port 134-M. This operation may involve translation through overlay BAR 136-M.

In step 210, the copied PCIe write is received at the directly-addressable storage device 108 and the corresponding data is temporarily stored in volatile memory 122. The process then ends for the given PCIe write processed through steps 204, 206, 208 and 210. It is assumed that the process returns to step 204 to process one or more additional PCIe writes until all of the PCIe writes generated in step 202 for the data received in step 200 are processed. This return from step 210 to step 204 is not explicitly shown in the figure.

In step 212, the multicast logic 138 makes a determination as to whether or not the address of the given PCIe write falls within the multicast interrupt group window. If the determination is affirmative, the process moves to step 216, and if the determination is negative, the process moves to step 214.

In step 214, the PCIe write is routed by the PCIe switch 110 to upstream port 130-1 and forwarded from that port to processor root port 114-N. The corresponding data is then written to processor memory 104. The PCIe write is not copied to the downstream port 134-M, but is instead sent via "unicast" to the upstream port 130-1. It is again assumed that the process returns to step 204 to process one or more additional PCIe writes until all of the PCIe writes generated in step 202 for the data received in step 200 are processed. This return from step 214 to step 204 is not explicitly shown in the figure.

In step 216, the PCIe write is routed by the PCIe switch 110 to upstream port 130-1 and forwarded from that port to processor root port 114-N. The PCIe write is also copied to downstream port 134-M. This operation may involve translation through overlay BAR 136-M.

In step 218, the original PCIe write received by the root port 114-N is routed to the interrupt logic 116 of the processor 102. It is assumed that this PCIe write comprises a message signaled interrupt or MSI. The interrupt logic 116 interprets the MSI as an I/O controller interrupt.

In step 220, the copied PCIe write is received at directly-addressable storage device 108. The directly-addressable storage device 108 determines that the PCIe write falls within a range of a predefined one of the BARs 120.

In step 222, the directly-addressable storage device 108 commits any outstanding data in volatile memory 122 to non-volatile memory 124, after which it generates its own PCIe write also containing an MSI. This PCIe write generated by the directly-addressable storage device 108 is also referred to as an MSI PCIe write.

In step 224, the MSI PCIe write from the directly-addressable storage device 108 is received at the downstream port 134-M of the PCIe switch 110. It is routed from the downstream port 134-M to the upstream port 130-1 and is forwarded from that port to the processor root port 114-N.

In step 226, the MSI PCIe write is routed to processor interrupt logic 116, where it is interpreted as a directly-addressable storage device interrupt. This directly-addressable storage device interrupt illustratively provides an acknowledgment from the directly-addressable storage device 108 to the processor 102 that any outstanding data in the volatile memory 122 has been committed to the non-volatile memory 124. It is an example of what is also referred to herein as "data durability signaling." Other types of interrupts or data durability signaling may be used in other embodiments. As with steps 210 and 214, the process after step 226 may return to step 204 to process one or more additional PCIe writes until all of the PCIe writes generated in step 202 for the data received in step 200 are processed. This return from step 226 to step 204 is not explicitly shown in the figure.

As mentioned previously, illustrative embodiments are not limited to the context of storing data incoming into the storage system, but can additionally or alternatively be used in conjunction with movement of data previously received and stored in the storage system. The FIG. 2 process can be adapted in a straightforward manner to support these and other contexts involving storage of data in the storage system.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a processor, processor memory, switch and directly-addressable storage device. For example, the ordering of the process steps may be varied in other embodiments, or certain steps may be performed concurrently with one another rather than serially. Also, one or more of the process steps may be repeated periodically, or multiple instances of the process can be performed in parallel with one another in order to process data received from different devices by a given I/O controller or data received from different devices in different I/O controllers of a system comprising multiple such I/O controllers.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments disclosed herein can provide a number of significant advantages relative to conventional arrangements.

For example, one or more embodiments provide data durability signaling including a particular efficient mechanism for causing a directly-addressable storage device to persist data from its volatile memory into its non-volatile memory and to provide a corresponding interrupt to a processor. More particularly, PCIe writes associated with received data to be stored in the system can be processed in a manner that provides the data durability signaling while reducing the involvement of the processor.

In these and other embodiments, copying of data to a directly-addressable storage device and commitment of the data therein to non-volatile memory can be achieved without requiring multiple accesses to the processor memory, thereby avoiding the associated processor overhead costs and also reducing latency. Storage system operations such as write caching and journaling are significantly improved as a result.

Some embodiments are implemented using PCIe multicast functionality of a PCIe switch, although other embodiments can be configured to utilize alternative functionality such as dual cast functionality implemented in a PCIe root complex. In arrangements of the latter type, the PCIe switch may be eliminated. Other illustrative embodiments can be based on multicast-within-processor implementations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of processor 102, I/O controller 106, directly-addressable storage device 108 and PCIe switch 110 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of storage systems, processors, memories, controllers, switches, directly-addressable storage devices and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage system comprising:
   at least one processor;
   a processor memory;
   an input-output controller; and
   a directly-addressable storage device having volatile memory and non-volatile memory;
   wherein the input-output controller generates a plurality of write commands in conjunction with storage of data in the storage system, the write commands including at least a first write command comprising the data and a second write command comprising one or more interrupts;
   wherein the storage system is configured:
   to determine which of first and second windows that an address of a given one of the write commands falls within;
   responsive to the address falling within the first window, to write the data to the processor memory and to copy the write command to the directly-addressable storage device so as to cause the data to also be written to the volatile memory of that storage device; and
   responsive to the address falling within the second window, to copy the write command to the directly-addressable storage device so as to provide at least one of the one or more interrupts to that storage device.

2. The storage system of claim 1 wherein the processor further comprises a PCIe root complex having a plurality of root ports supporting communication with the input-output controller and the directly-addressable storage device.

3. The storage system of claim 2 further comprising a PCIe switch coupled via an upstream port of the PCIe switch to a given one of the root ports of the PCIe root complex of the processor and coupled via respective downstream ports of the PCIe switch to the input-output controller and the directly-addressable storage device.

4. The storage system of claim 3 wherein the PCIe switch further comprises multicast logic configured to determine if the address of the given write command falls within a specified data group window or a specified interrupt group window and to control copying of the write command in accordance with that determination.

5. The storage system of claim 1 wherein the write commands comprise respective PCIe writes.

6. The storage system of claim 1 wherein the directly-addressable storage device comprises one or more solid-state drives.

7. The storage system of claim 1 wherein the interrupt provided to the directly-addressable storage device is interpreted by the directly-addressable storage device as a request to commit any outstanding data in the volatile memory to the non-volatile memory.

8. The storage system of claim 1 wherein the directly-addressable storage device comprises at least one programmable base address register.

9. The storage system of claim 8 wherein the directly-addressable storage device confirms that the interrupt provided to the directly-addressable storage device falls within a range of a predefined base address register prior to responding to receipt of the interrupt.

10. The storage system of claim 1 wherein the directly-addressable storage device responds to receipt of the interrupt by writing data from the volatile memory to the non-volatile memory and generating a corresponding additional interrupt to the processor, and wherein the interrupt to the processor provides an acknowledgment from the directly-addressable storage device to the processor that any outstanding data in the volatile memory has been committed to the non-volatile memory.

11. The storage system of claim 1 wherein the directly-addressable storage device responds to receipt of the interrupt by writing data from the volatile memory to the non-volatile memory and generating a corresponding additional interrupt to the processor, and wherein the interrupt to the processor comprises a modified version of the interrupt provided to the directly-addressable storage device.

12. The storage system of claim 1 wherein the directly-addressable storage device responds to receipt of the interrupt by writing data from the volatile memory to the non-volatile memory and generating a corresponding additional interrupt to the processor, and wherein the interrupt to the processor comprises a unique interrupt that is distinct from the interrupt provided to the directly-addressable storage device.

13. The storage system of claim 1 wherein the interrupts comprise respective message signaled interrupts.

14. An information processing system comprising the storage system of claim 1 and one or more additional devices that provide the data to the input-output controller.

15. A method comprising:
configuring a storage system to include at least one processor, a processor memory, an input-output controller, and a directly-addressable storage device having volatile memory and non-volatile memory;
generating in the input-output controller a plurality of write commands in conjunction with storage of data in the storage system, the write commands including at least a first write command comprising the data and a second write command comprising one or more interrupts;
determining which of first and second windows that an address of a given one of the write commands falls within;
responsive to the address falling within the first window, writing the data to the processor memory and copying the write command to the directly-addressable storage device so as to cause the data to also be written to the volatile memory of that storage device; and
responsive to the address falling within the second window, copying the write command to the directly-addressable storage device so as to provide at least one of the one or more interrupts to that storage device.

16. The method of claim 15 wherein the storage system further comprises a PCIe switch coupled via an upstream port of the PCIe switch to a root port of a PCIe root complex of the processor and coupled via respective downstream ports of the PCIe switch to the input-output controller and the directly-addressable storage device.

17. The method of claim 16 wherein the PCIe switch further comprises multicast logic configured to determine if the address of the given write command falls within a specified data group window or a specified interrupt group window and to control copying of the write command in accordance with that determination.

18. A computer program product comprising a non-transitory processor-readable storage medium having stored therein program code of one or more software programs, wherein the program code, when executed by a storage system comprising at least one processor, a processor memory, an input-output controller, and a directly-addressable storage device having volatile memory and non-volatile memory, causes the storage system:
to generate in the input-output controller a plurality of write commands in conjunction with storage of data in the storage system, the write commands including at least a first write command comprising the data and a second write command comprising one or more interrupts;
to determine which of first and second windows that an address of a given one of the write commands falls within;
responsive to the address falling within the first window, to write the data to the processor memory and to copy the write command to the directly-addressable storage device so as to cause the data to also be written to the volatile memory of that storage device; and
responsive to the address falling within the second window, to copy the write command to the directly-addressable storage device so as to provide at least one of the one or more interrupts to that storage device.

19. The computer program product of claim 18 wherein the storage system further comprises a PCIe switch coupled via an upstream port of the PCIe switch to a root port of a PCIe root complex of the processor and coupled via respective downstream ports of the PCIe switch to the input-output controller and the directly-addressable storage device.

20. The computer program product of claim 19 wherein the PCIe switch further comprises multicast logic configured to determine if the address of the given write command falls within a specified data group window or a specified interrupt group window and to control copying of the write command in accordance with that determination.

* * * * *